United States Patent [19]

Ieoka et al.

[11] Patent Number: 5,164,824
[45] Date of Patent: Nov. 17, 1992

[54] IMAGE FREEZING SIGNAL-PROCESSING APPARATUS

[75] Inventors: Syouichi Ieoka, Takahama; Masahiko Sasaki, Hachioji; Takehiro Nakagawa, Hachioji; Shinji Yamashita, Hachioji; Masao Uehara, Hachioji; Katsuyuki Saito, Kokubunji; Akinobu Uchikubo, Ome; Akirhiro Miyashita, Hachioji, all of Japan

[73] Assignee: Olympus Optical Co., Ltd., Tokyo, Japan

[21] Appl. No.: 774,940

[22] Filed: Oct. 11, 1991

[30] Foreign Application Priority Data

Oct. 12, 1990 [JP] Japan ................ 2-274480
Mar. 19, 1991 [JP] Japan ................ 3-54871

[51] Int. Cl.⁵ ........................................ A61B 1/04
[52] U.S. Cl. .................................. 358/98; 128/6; 358/105
[58] Field of Search ............... 358/98, 105; 128/6

[56] References Cited

U.S. PATENT DOCUMENTS 4,699,125 10/1987 Komatsu .................. 358/98
4,901,143 2/1990 Uehara et al.
4,933,757 6/1990 Kanno ....................... 358/105
5,032,913 7/1991 Hattori ..................... 358/105

Primary Examiner—Howard W. Britton
Attorney, Agent, or Firm—Armstrong & Kubovcik

[57] ABSTRACT

An object of the present invention is to provide an image freezing signal-processing apparatus capable of eliminating a necessity of using a large number of memories, reducing a time lag and preventing an image deviation. Sequence signals for R, G and B are stored in a first memory via an A/D converter and as well as the same are supplied to a movement detection/control circuit so that an image which displays the minimum about of movement in a predetermined time passed from the freeze signal is read from the first memory so as to be written to a still picture memory. The movement detection/control circuit stops the movement detection operation in a case where the image which displays a small amount of movement is stored in the still picture memory so as to transmit the image stored in the still picture memory as a still picture in a state in which updating is inhibited. In a case where an image which displays a small amount of movement is not stored, an image which displays the minimum amount of movement in a predetermined time is transmitted as a still picture.

24 Claims, 15 Drawing Sheets

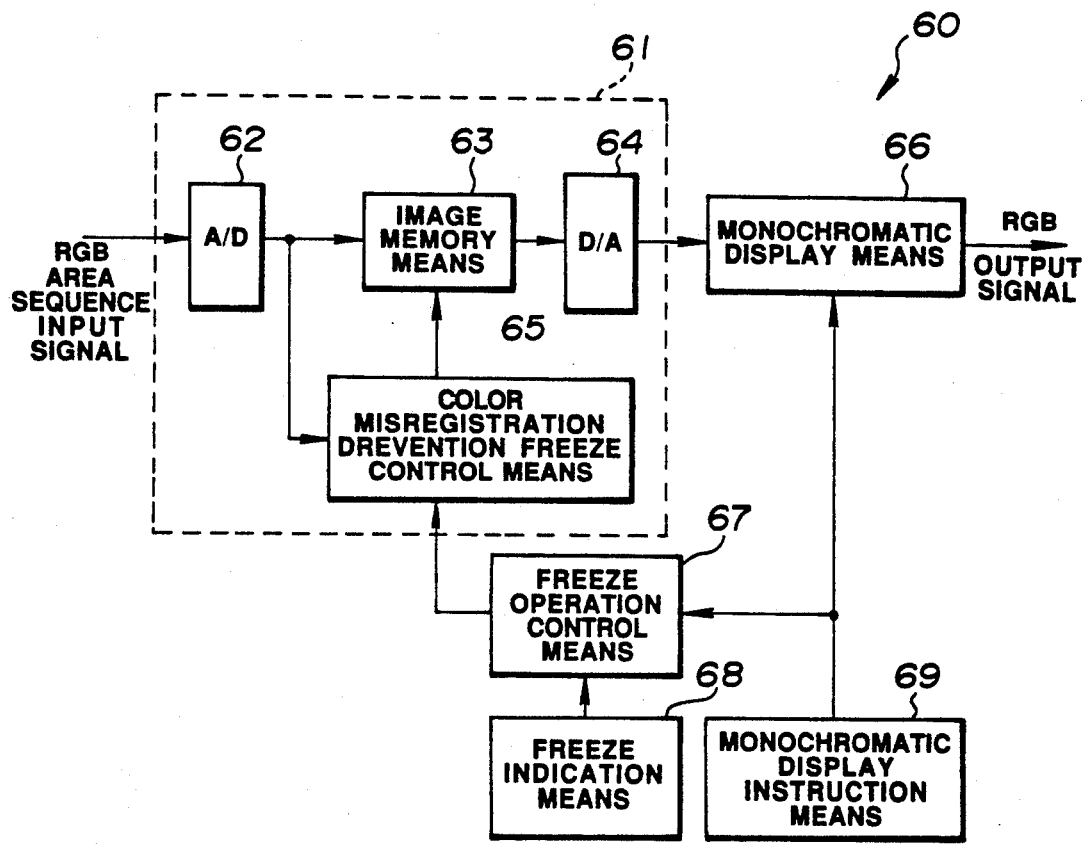
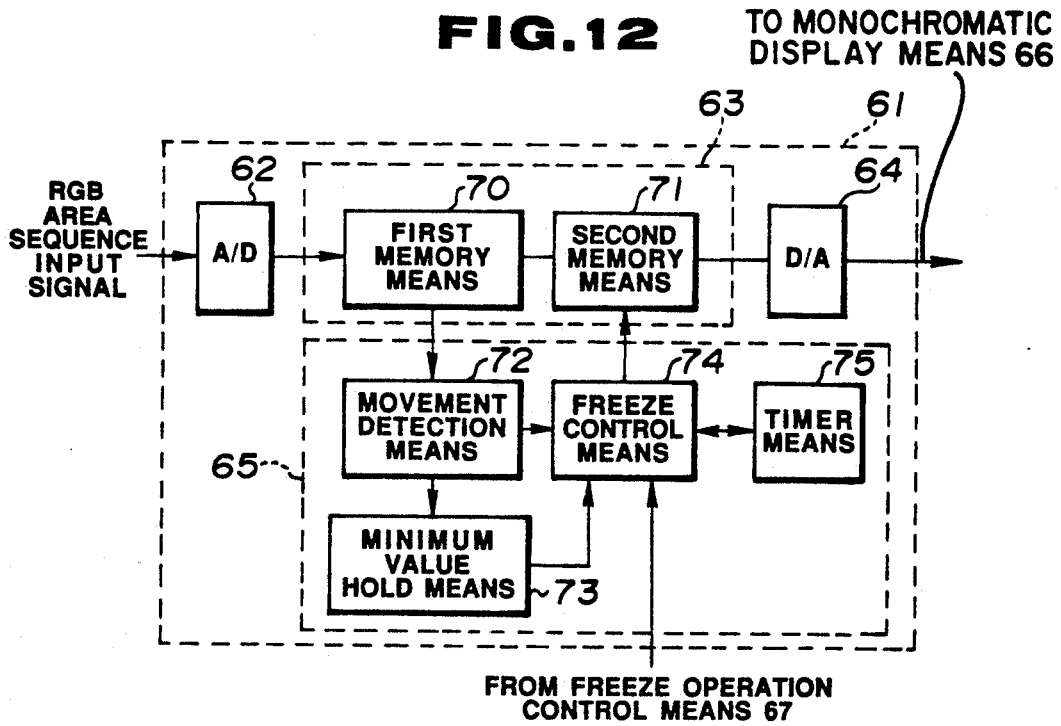

IMAGE FREEZING SIGNAL-PROCESSING APPARATUS

BACKGROUND OF THE INVENTION

1. Field of the Invention

The present invention relates to an image freezing signal-processing apparatus capable of forming a freeze image free from blurs.

2. Related Art Statement

Recently, the density of pixels has been raised and the size of the chip has been extremely reduced with an advancement of a solid state image sensing technology. As a result, an endoscope having, at its leading portion, a solid-state image sensing device, that is, so-called an electronic endoscope apparatus has been developed. An electronic endoscope apparatus of the type described above has a function of observing an inspection subject portion by inserting its insertion portion into the coelom and another function of recording the observed image of the subject portion. Therefore, the observing performance and the quality of the recorded image are very important to accurately diagnose the inspection subject portion. As a result, an operator of the endoscope must performs the recording operation in such a manner that an image of the inspection subject portion is freeze-displayed several times after a patient has been allowed to repose. Then, the optimum image is selected and, as a still picture, recorded to an apparatus for photographing the monitor image, a video printer, a still video floppy apparatus or the like. However, if the patient is allowed to repose, the inspection subject portion necessarily moves because the inspection subject portion is an organism. As a result, there arises a problem in that the freeze picture forming operation must be repeatedly performed in order to eliminate the image blurs due to the movement of the subject portion.

The above-described deterioration in the recorded image due to the movement of the subject takes place depending upon the type of the image sensing device and the image sensing method. For example, in a case where a frame-transfer type CCD (hereinafter called a "FT type CCD") is used as the image sensing device, the movement of the subject in the image exposure period causes the image deviation to be generated. In another case where an interline type CCD (hereinafter called an "IT type CCD") is used to perform a jump scanning operation, a flicker take place due to the image difference generated between the fields in addition to the above-described problem of image blurs, as described above, caused from the movement of the subjected in the image exposure period. Furthermore, a color plane sequence method, in which a monochromatic type CCD is attached to the leading portion of the endoscope for the purpose of reducing the diameter of the endoscope and, for example, RGB sequence light is used as illuminating light, encounters a problem in that the movement of the subject is displayed as the color misregistration because each of R, G and B original color images sequentially photographed in the time sequential manner are displayed after they have been made time-coincide. As a result, a problem of a so-called color misregistration takes place.

In order to overcome the above-described problems, the applicant of the present invention has disclosed an apparatus in Japanese Patent Application No. 1988-209677. According to this disclosure, the apparatus is arranged in such a manner that image blurs (color misregistration or the like) of each of image signals supplied in a certain time period is detected and an image signal displaying the minimum image blurs is displayed on a monitor or the like as a still picture in place of the conventional structure in which the still picture is displayed on a monitor or the like simultaneously with the commencement of the freezing operation.

However, an undesirable certain time lag is generated in the above-described apparatus disclosed in Japanese Patent Application No. 1988-209677 from the moment at which the freeze operation is performed to the moment at which the still picture is actually obtained. Therefore, an operator of the apparatus feels strange about the apparatus or an undesirable image is frozen.

It might be feasible to employ a structure of the type disclosed in Japanese Patent Application No. 1988-109187 and arranged in such a manner that a plurality of continuous image frames are recorded and an image free from the color misregistration is selected from a plurality of the image frames so as to be displayed. However, an apparatus of this type is disadvantageous in terms of cost and size reductions because a memory having a large capacity must be provided.

OBJECTS AND SUMMARY OF THE INVENTION

An object of the present invention is to provide an image freezing signal-processing apparatus capable of eliminating a necessity of using a large-capacity memory, reducing a time lag and preventing image blurs.

According to one aspect of the present invention, there is provided an image freezing signal-processing apparatus comprising:

movement detection means for detecting, from a supplied image signal, the movement of a subject;

minimum value detection means for detecting, from an output from the movement detection means, the minimum value of the amount of movement of the subject;

still picture storage means for storing a supplied image signal which displays the minimum the amount of movement by an output from the minimum value detection means;

image freeze instruction means for transmitting an image freeze instruction signal;

timer means for setting a time in which the minimum value detection means is operated; and control means for controlling writing, to the still picture storage means, of the image which displays the minimum the amount of movement detected, with time, by the minimum value detection means during the operation of the timer means and as well as controlling, if the freeze instruction signal is transmitted during the operation of the timer means, inhibition of writing to the still picture storage means immediately after or after a predetermined time has passed from the moment at which the freeze instruction signal is transmitted during the operation of the timer.

Other and further objects, features and advantages of the invention will be appear more fully from the following description.

BRIEF DESCRIPTION OF THE DRAWINGS

FIG. 2 is a structural view which illustrates an endoscope apparatus to which the first embodiment of the present invention is applied;

FIG. 3 is a block diagram which illustrates the structure of a movement detection/control circuit;

FIG. 4 is a timing chart which illustrates the operation;

FIG. 7 is a block diagram which illustrates a color misregistration prevention freeze circuit;

FIG. 8 illustrates a period in which the color misregistration prevention freeze circuit is operated;

FIG. 9 illustrates an address pickup operation for performing write/read to and from a frame memory;

FIG. 10 is a timing chart which illustrates the operation;

FIGS. 11 to 15 illustrate a fifth embodiment of the present invention, where

FIG. 11 is a block diagram which illustrates the structure of an image freezing signal-processing apparatus;

FIG. 12 is a block diagram which illustrates a color misregistration prevention freeze means;

FIG. 13 is a circuit diagram which illustrates a monochromatic display means;

FIG. 14 is a block diagram which illustrates the structure of modification to the color misregistration prevention freeze means;

FIG. 15 is a circuit diagram which illustrates the structure of modification to the monochromatic display means;

FIG. 16 is a structural view which illustrates the endoscope apparatus;

FIG. 17 is a circuit diagram which illustrates the hold circuit shown in FIG. 16;

FIG. 18 is a schematic structural view which illustrates an essential portion;

BEST MODE FOR CARRYING OUT THE INVENTION

Figure 1:
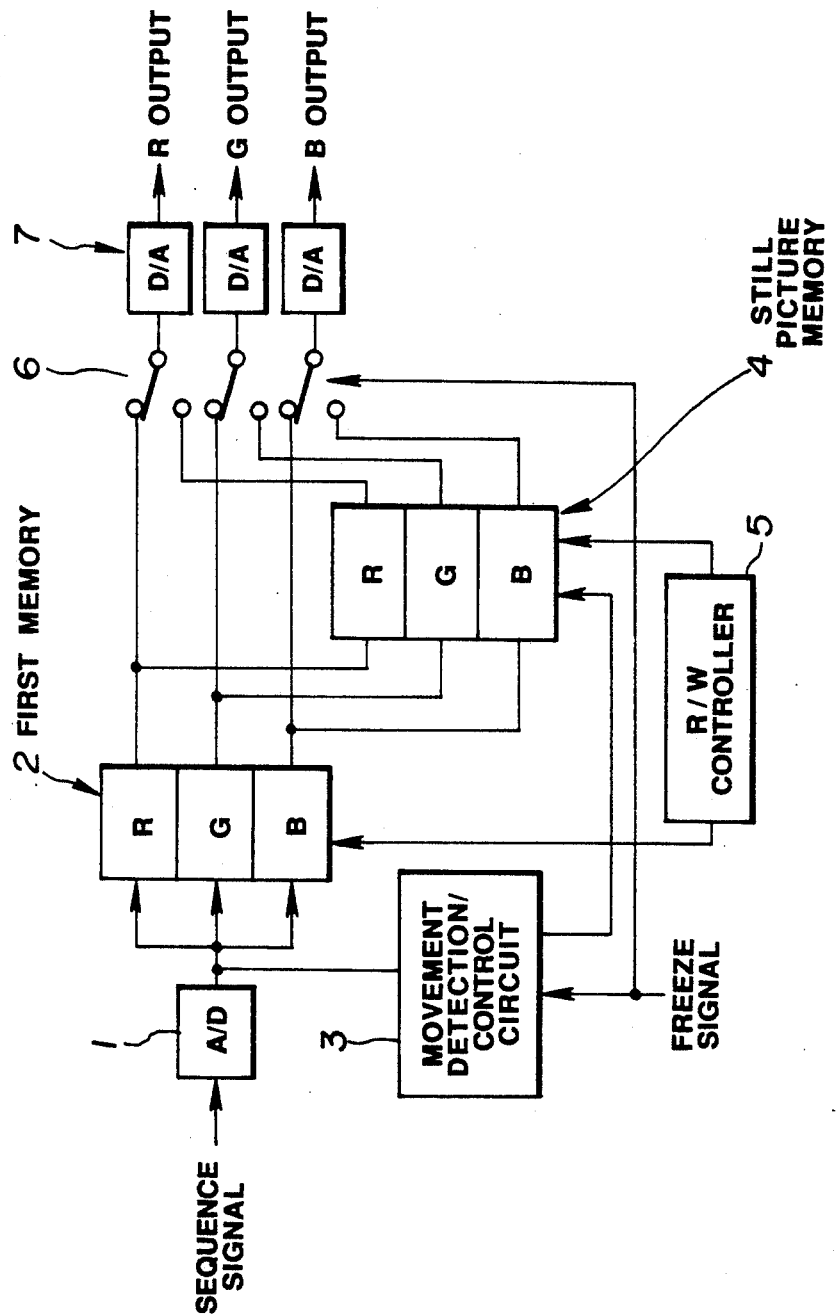
FIG. 1 illustrates the schematic structure of the present invention.

According to the present invention, R, G and B sequence signals are, for example, stored in a first memory 2 via an A/D converter 1 for the purpose of establishing time coincidence and as well as the same are supplied to a movement detection/control circuit 3 so that an image, which displays the minimum movement in a predetermined time from the timing of a freeze signal transmitted by the result of a freezing operation, is written from a first memory 2 to a still picture memory 4 serving as a second memory. The first memory 2 and the still picture memory 4 control read/write of the image by a R/W controller 5. In order to cause the image to be transmitted from the first memory 2 to the still picture memory 4 in response to the freeze signal, a switch 6 is switched on so that the above-described image is transmitted via a D/A converter 7.

The above-described movement detection/control circuit 3 stops its movement detection operation in a case where an stored in the still picture memory 4. Furthermore, the detection/control circuit 3 transmits, as a still picture, the image stored in the still picture memory 4 in a state in which updating is inhibited. In a case where the image, the quantity of movement of which is small, is not stored, the detection/control circuit 3, as the still picture, transmits the image which displays the minimum movement in a predetermined time.

Figure 2:
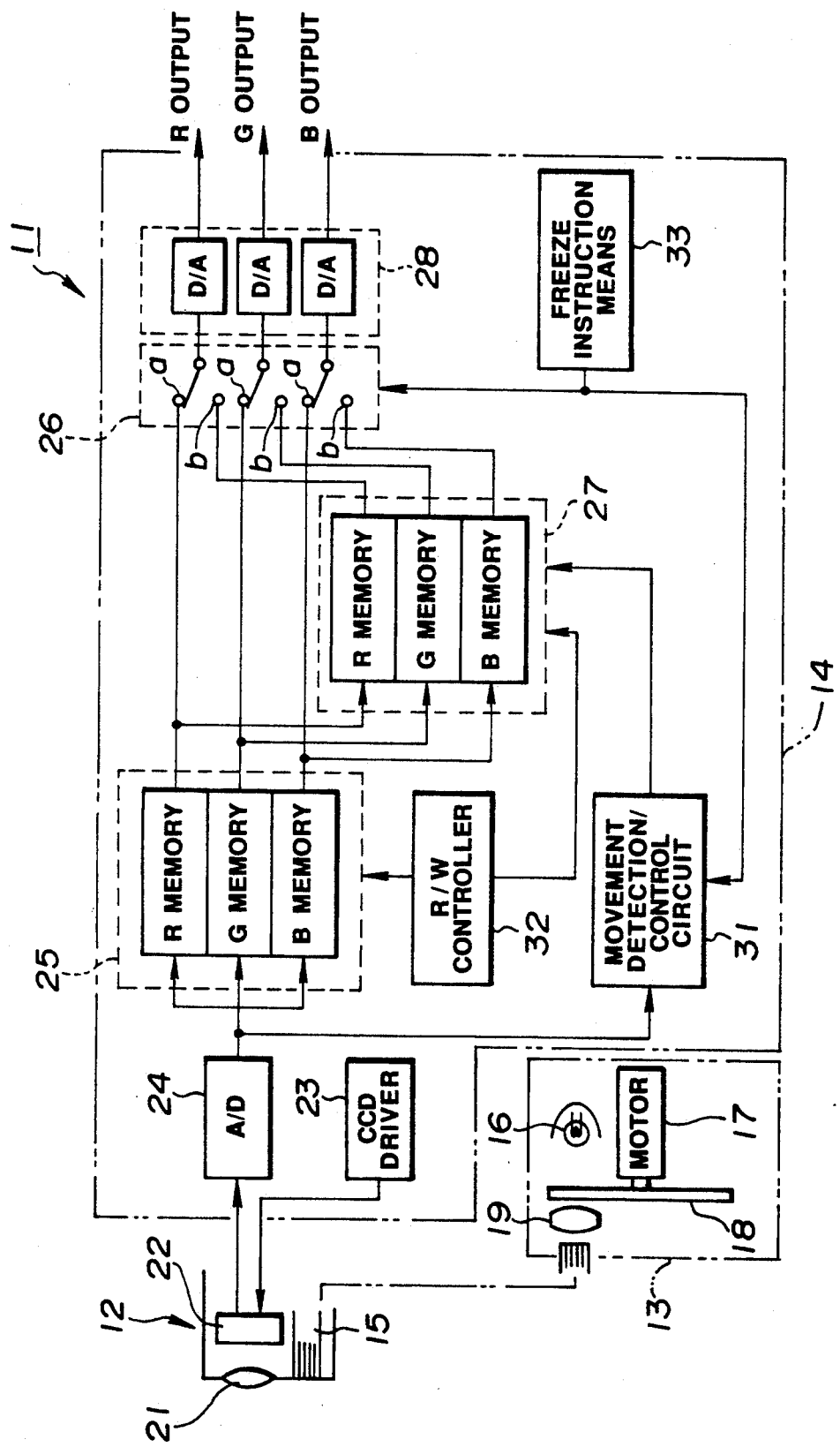
FIGS. 2 to 4 illustrate a first embodiment of the present invention, where

An endoscope apparatus 11 which is shown in FIG. 2 and to which the first embodiment of the present invention is applied comprises an electronic scope 12 including a plane sequence type imaging means, a plane sequence type light source unit 13 for supplying illuminating light to the electronic scope 12 and an image processor 14 for processing signals supplied from the electronic scope 12, the image processor 14 constituting the first embodiment of the present invention. The endoscope 11 further comprises a display device (omitted from illustration).

The above-described electronic scope 12 has an elongated insertion portion into which a light guide 15 for transmitting illuminating light is inserted. The rear end portion of the light guide 15 is connected to the light source unit 13 so that plane sequence light is supplied from the light source unit 13.

That is, white light emitted from a lamp 16 is converted into red, green and blue plane sequence light beams by a red, green and blue color transmissible filters which constitute a rotational color filter 18 which is rotated by a motor 17. The red, green and blue plane sequence light beams thus-created are condensed and applied to the rear end surface of the light guide 15 by a condenser lens 19. The plane sequence light is transmitted by the light guide 15 before it is radiated from an end surface of the leading portion of the insertion portion toward a forward subject. The image of the subject irradiated with the plane sequence light is, by an objective lens 21, attached to the leading portion of the insertion portion, imaged onto a CCD 22 disposed on the focal plane of the objective lens 21. As a result of the action of the CCD 22, the optical image is photoelectrically converted. The electric signal thus-created is read out in response to a drive signal transmitted from a CCD driver 23 before it is converted into a digital color sequence signal by an A/D converter 24. The digital color sequence signal is stored in a R-memory, a G-memory and a B-memory disposed in a time-coincidence memory 25 in such a manner that the color components of the digital color sequence signal correspond to the color memories. For example, a signal photographed under red illuminating light is stored in the R-memory.

The image signals respectively stored in the R, G and B memories are simultaneously read out so as to be supplied to a contact a of a switch 26 as a color/plane time-coincidence signal and as well as the same is supplied to a still picture memory portion 27 for holding a still picture.

The signals after they have passed through the switch 26 are converted into analog color signals by D/A converters of a D/A converter portion 28 before they are transmitted to the display device (omitted from illustration).

The output from the above-described A/D converter 24 is supplied to a movement detection/control circuit 31 for detecting color misregistration and controlling the action of causing the still picture to be stored in the still picture memory 27. The still picture memory portion 27, in its R, G and B memories, stores the color/-plane time-coincidence signal transmitted from the time-coincidence memory portion in response to a control signal supplied from the movement detection/control circuit 31, the R, G and B memories constituting the still picture memory portion 27. The signal, which is made time-coincidence with the time-coincidence memory 25, is read out from the still picture memory portion 27 in response to a signal transmitted from a R/W (Read/Write) controller 32 so as to be supplied to a contact b of the switch 26.

The switch 26 is switched to to be connected to a contact (that is, contact b) which is connected to the still picture memory portion 27 in response to a freeze instruction signal supplied from a freeze instruction means 33 for instructing the freezing operation to be performed. As a result, when the above-described freeze instruction means 33 is operated, the image read from the still picture memory portion 27 is displayed on the display device.

Figure 3:
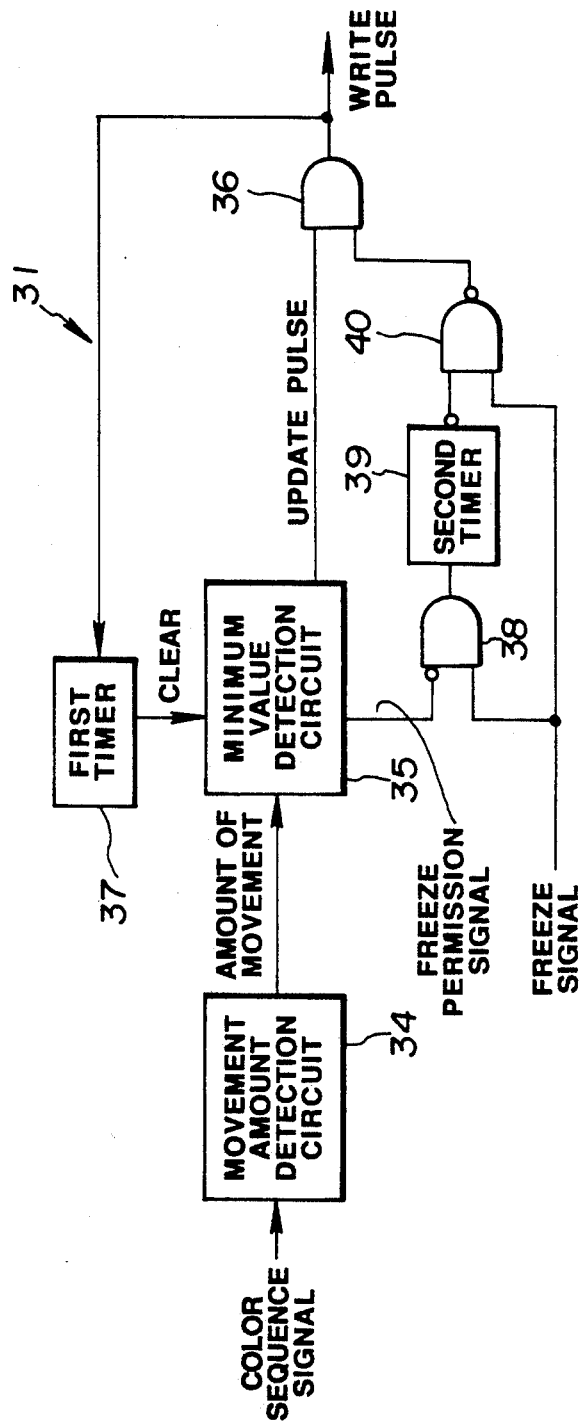

FIG. 3 illustrates the structure of the movement detection/control circuit 31 in which the color sequence signal supplied thereto is first supplied to a movement amount detection circuit 34 so that the amount of movement of each image (or the amount of the color misregistration) is detected. As the method of detecting the amount of movement, a method disclosed in Japanese Patent Publication No. 1988-206949 or another method disclosed in Japanese Patent Publication No. 1988-272830 may be employed. The output from the movement amount detection circuit 34, that is, the detected amount of movement, is supplied to a minimum value detection circuit 35.

The minimum value detection circuit 35 is constituted in a manner as disclosed in for example U.S. Pat. No. 4,901,143 so as to hold the minimum amount of the movement in terms of the elapsed time, the minimum amount being determined in accordance with the amounts of movement supplied to the minimum value detection circuit 35. The minimum value detection circuit 35 transmits an update pulse to a first gate circuit 36 whenever the above-described minimum value is updated, the first gate circuit 36 comprising an AND circuit. The first gate circuit 36 transmits write pulses to the still picture memory portion 27 and as well as commences a first timer 37 to bring the first timer 37 into a triggerable state.

After the timer operation of the above-described first timer 37 has been commenced, the first timer 37 transmits a pulse which is raised to "H" for a predetermined time, the pulse being then lowered to "L" after the above-described predetermined time has passed. As a result, the minimum value detection circuit 35 is cleared to the maximum value (in terms of the amount of movement). The above-described "predetermined time" is a time in which the past image is held in the still picture memory 27.

The above-described minimum value detection circuit 35 transmits a freeze permission signal to a second gate circuit 38 if the held amount of movement is smaller than a predetermined freeze level. Also a freeze signal is supplied to the second gate circuit 38 the output of which is supplied to a second timer 39. The timer operation of the second timer 39 is started when the freeze signal is supplied thereto in a period in which the freeze permission signal is not transmitted so that the pulse from the second timer 39 is lowered to "L" for a predetermined time T2. The above-described timer operation determines the operational time required to generate a freeze image after the freeze signal has been supplied.

The output from the second timer 39 is, together with the freeze signal, supplied to a first gate 36 via a third gate 40 comprising a NAND gate, the first gate 36 being a gate to which the update pulse is supplied. That is, when the timer 39 is raised to "H" after an elapse of the predetermined time T2 in which the same is lowered to "L" in a state where the freeze signal has been transmitted, also the output from the third gate 40 is raised to "H". As a result, the update pulse can be transmitted through the first gate 36 so that the image which displays the minimum amount of movement detected by the minimum value detection circuit 36 in the predetermined time T2 can be stored in the still picture memory portion 27 in response to the above-described update pulse.

Then, the operation of the first embodiment will now be described with reference to a timing chart shown in FIG. 4.

The color sequence signal is supplied to the movement amount detection circuit 34 so that the amount of movement of the color sequence signal is detected. As shown in FIG. 4 (a), the amount of movement of each of the images given numbers as shown in FIG. 4 (a) are sequentially detected as shown in, for example, FIG. 4 (b). Referring to FIG. 4 (b), a freeze level is set as the upper limit value of the amount of movement permitted as the still picture.

Figure 4:
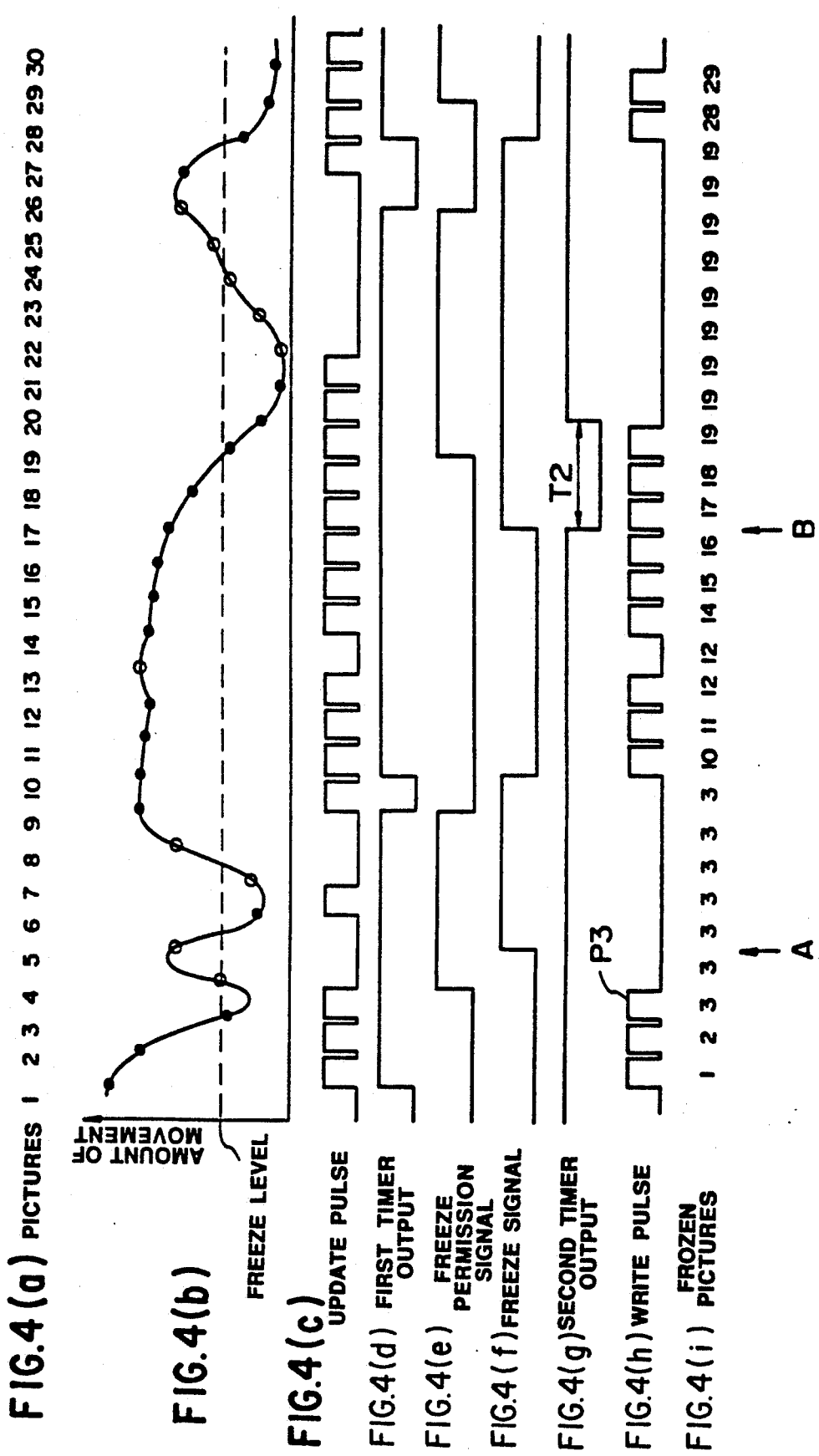

With reference to the amounts of movement shown in FIG. 4 (b), the minimum value detection circuit 35 transmits the update pulse as shown in FIG. 4 (c) if the amount of movement of the supplied image is smaller than the amount of movement which has been held. If the level of the output from the first timer 37 is "H" as shown in FIG. 4 (d) and as well as the level of the freeze signal is "L" as shown in FIG. 4 (f), the update pulse is, via the first gate 36, transmitted to the still picture memory portion 27 as the write pulse as shown in FIG. 4 (h). The still picture memory portion 27 stores an image which displays the minimum amount of movement. The Nos. given to the freeze pictures held in the still picture memory portion 27 are shown in FIG. 4 (i).

If the above-described amount of movement becomes lower than the freeze level, the minimum value detection circuit 31 transmits the freeze permission signal to the second gate 38 as shown in FIG. 4 (e). If the freeze signal shown in FIG. 4 (f) is, in the above-described state, transmitted at time A designated by symbol A shown in FIG. 4 (f) within the time set to the first timer 37 from the final update pulse (designated by P3 shown in FIG. 4 (h)), an image written at the timing of the above-described write pulse P3 is transmitted as a freeze picture to the display device via the switch 26 shown in FIG. 2.

That is, an image which displays the minimum amount of movement within the time set to the first timer 37 from the time at which the freezing operation has been performed is displayed as the freeze picture.

On the contrary, if the freeze signal is transmitted due to the freeze operation in a state where the freeze permission signal is not transmitted as is taken place at time designated by symbol B shown in FIG. 4, the second timer 39 is started in response to the above-described freeze signal via the second gate 38. As a result, the level is lowered to "L" for the predetermined time T2 as shown in FIG. 4 (g). When the level is raised to "H" after the above-described predetermined time T2, the image which displays the minimum amount of movement in this time T2 is written to the still picture memory portion 27 by the writing pulse before it is held so that the above-described image is displayed on the display device.

That is, the minimum movement still picture within the predetermined time T2 after the freeze signal is held and displayed.

According to the first embodiment, the freeze picture generating process performed in accordance with the movement detection period is sectioned before and after the freeze operation so that the time lag can be reduced. Furthermore, the number of the memories can be reduced.

Figure 5:
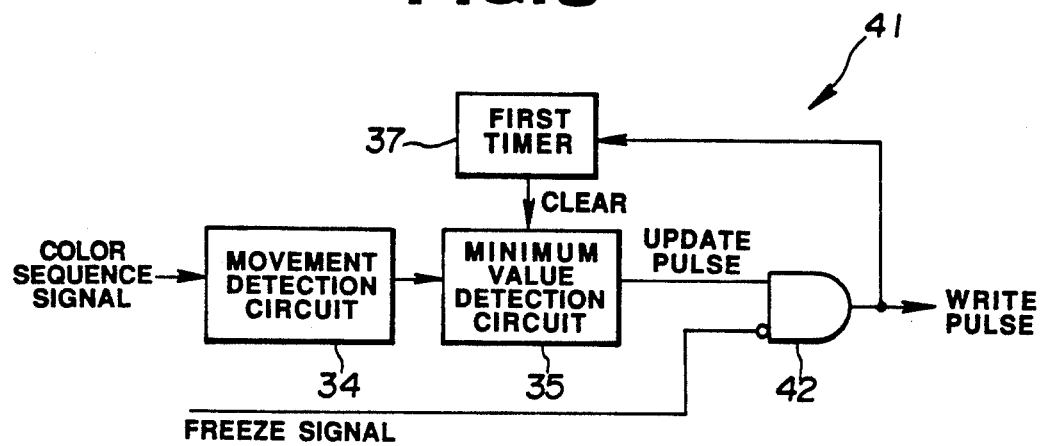
FIG. 5 is a block diagram which illustrates the structure of the movement detection/control circuit according to a second embodiment of the present invention.

As shown in FIG. 5, a movement detection/control circuit 41 according to a second embodiment of the present invention is constituted in such a manner that the movement detection period after the supply of the freeze signal is omitted from the structure.

The movement detection/control circuit 41 according to this embodiment is, as shown in FIG. 3, arranged in such a manner that the update pulse transmitted from the minimum value detection circuit 35 is supplied to a gate circuit 42 to which a signal formed by reversing the freeze signal is supplied. The output from the gate circuit 42 is, as the write pulse, transmitted to the still picture memory portion 27 and as well as the same is supplied to the first timer 37.

The remaining structures are the same as those according to the first embodiment.

Therefore, if the time of the freeze operation is in a state designated by symbol A sown in FIG. 4, the operation similar to the first embodiment is performed. In a state designated by symbol B, the image at this time is displayed as the freeze picture. As a result, the response to the freeze demand (operation) can be improved in comparison to that obtainable according to the first embodiment. On the contrary, the color misregistration or the image blur prevention performance will be deteriorated to a certain degree. However, since the freeze demand is made in a case where an operator recognizes subject image as a clear image, there arises no practical problem in the color misregistration prevention performance.

Figure 6:
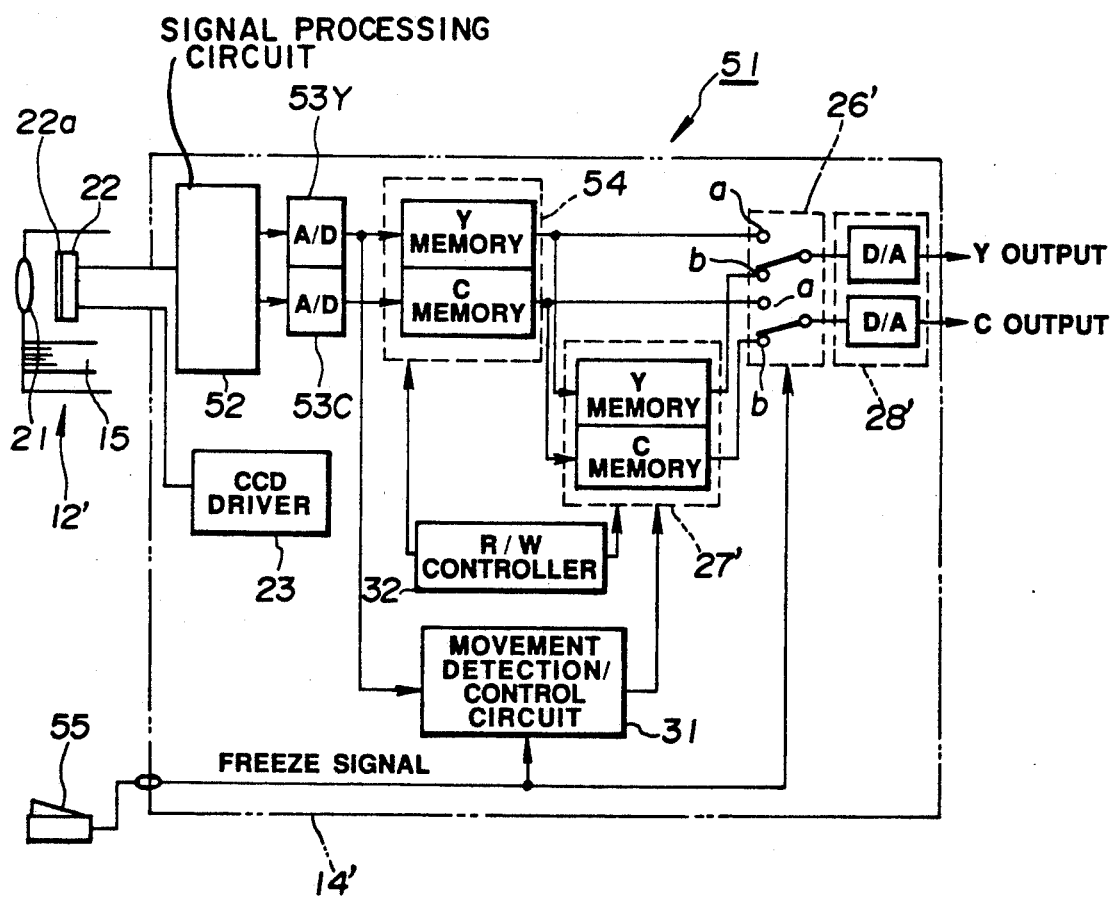
FIG. 6 is a structural view which illustrates an endoscope according to a third embodiment of the present invention.

A time-coincidence type endoscope apparatus 51 to which a first embodiment is applied as shown in FIG. 6 comprises an electronic scope 12' including a time-coincidence type photographing means, a light source unit (omitted from illustration) for emitting white light, a time-coincidence type image processor 14' according to the third embodiment and a display device (omitted from illustration).

The above-described electronic scope 12' is constituted by disposing a color separating color filter 22a to the front surface of the CCD 22 of the electronic scope shown in FIG. 2.

When the drive signal transmitted from the CCD driver 23 is supplied to the above-described CCD 22, a photoelectrically converted signal is read out so as to be supplied to a signal processing circuit 52. The signal processing circuit 52 separates the photoelectrically converted signal into brightness signal Y and color signal C so as to be respectively converted into digital signals by an A/D converter 53Y and 53C before they are stored in memories Y and C of a first memory portion 54.

The output from the above-described first memory portion 54 is supplied to a D/A converter of a D/A converter portion 28' via a switch 26' composed of twin circuits and the same are as well as supplied to a still picture memory portion 27'. The read/write operations of the two memory portions 54 and 27' are controlled by a R/W controller 32.

An output signal transmitted from the A/D converter 53Y is supplied to the movement detection/control circuit 31 in which the amount of movement is detected from a brightness signal which is different by one field/frame and as well as the write pulse for storing/holding the still picture in the still picture memory portion 27' is generated.

The above-described movement detection/control circuit 31 is connected to a foot switch 55 which is held by, for example, an image processor 14' via a cable. When the foot switch 55 is switched on, the output freeze signal is received. The above-described freeze signal serves as a signal for causing the switch 26' to switch over from the contact a to the contact b.

The movement detection/control circuit 31 according to the third embodiment comprises the circuit according to the structure shown in FIG. 5.

The operation and the effects obtainable from the third embodiment are substantially the same as those obtainable from the first embodiment and the second embodiment.

Figure 8:
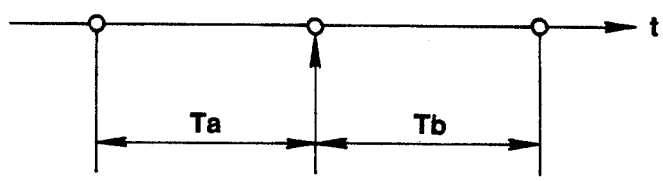

As shown in FIG. 8, the structure of a fourth embodiment has a circuit for freezing an image which displays the minimum color misregistration in predetermined periods before and after the receipt of the freeze trigger, that is, in a period including Ta and Tb.

Figure 7:
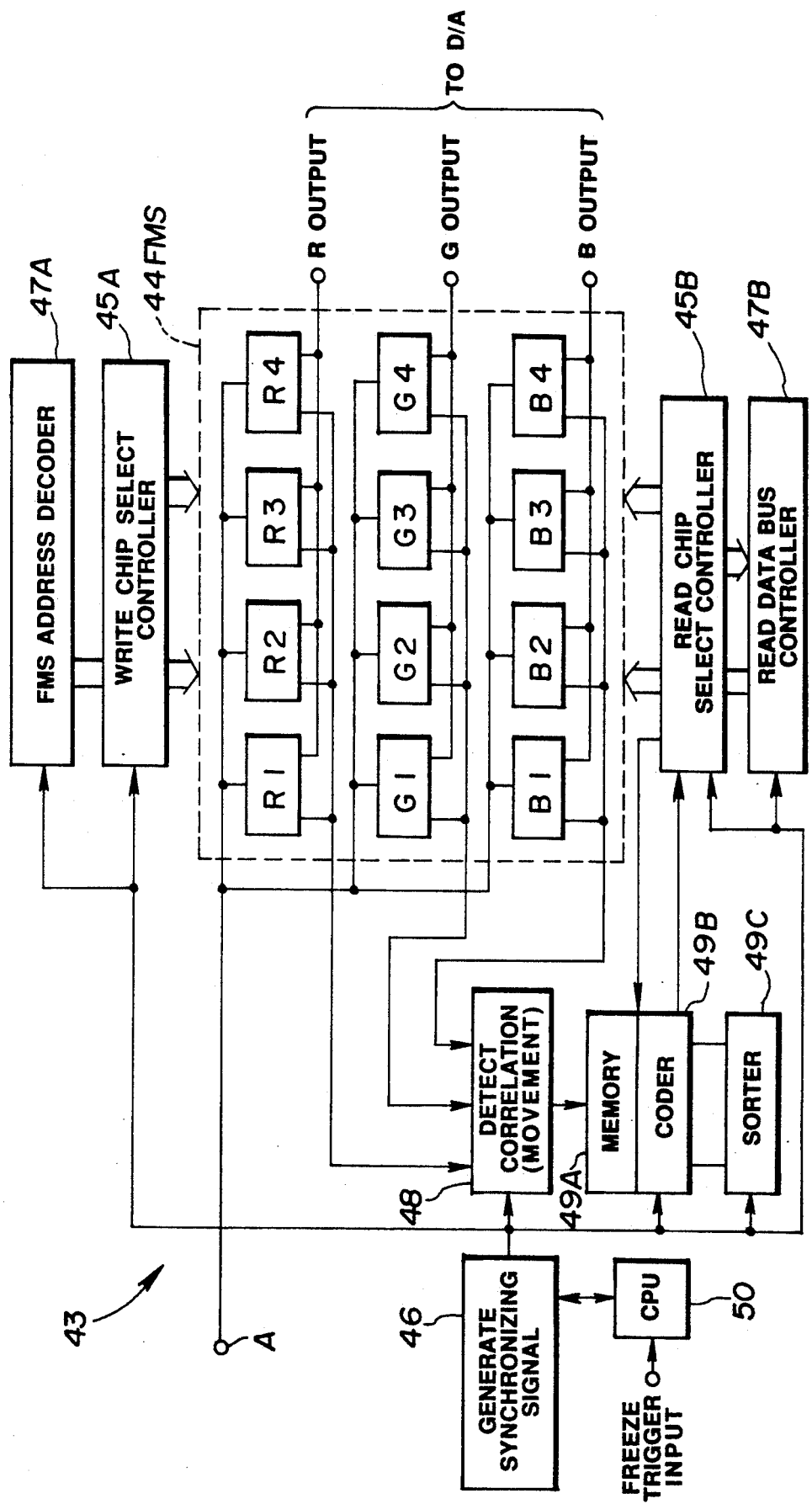
FIGS. 7 to 10 illustrate a fourth embodiment of the present invention, where

Referring to FIG. 7, terminal A of a color misregistration prevention freeze circuit 43 according to a fourth embodiment, every 1/6 seconds, receives R, G and B plane sequence signals for one frame. The signals thus-received are transmitted to a frame memory set (hereinafter called an "FMS") 44. The FMS 44 is constituted by frame memories in such a manner that four frame memories (designated by R1, R2, ..., B4 shown in FIG. 7) are allocated to each of R, G and B. Writing to each frame memory is controlled by a writing chip select controller 45A, while reading is controlled by a reading chip select controller 45B. The above-described writing and reading chip select controllers 45A and 45B respectively generate writing and reading chip select signals in synchronization with a synchronizing signal transmitted from a synchronizing signal generating circuit 46. The above-described synchronizing signal is also supplied to an address decoder 47A for the FMS. An address signal for the FMS 44 generated in the address decoder 47A for the FMS is supplied to the FMS 44. The above-described synchronizing signal is as well as supplied to other circuits.

Figure 9:
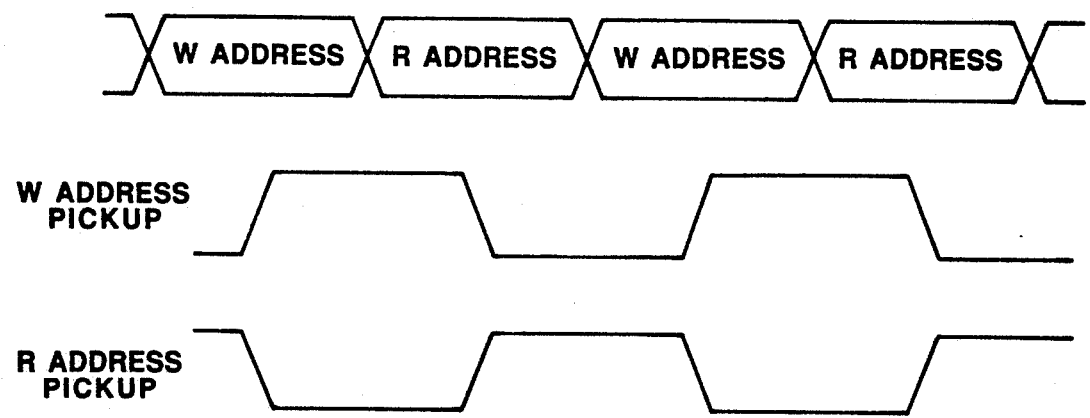

The FMS 44 has two output ports either of which is connected to an input terminal of a next D/A converter (for example reference numeral 28 shown in FIG. 2). The remaining output port is connected to an input terminal of a correlation detection circuit 48 for detecting the movement. When FMS 44 is controlled by a reading data bus select controller 47B in such a manner that the same data items are transmitted from the two output ports in a movie mode. The address of the FMS 44 is arranged in such a manner that the write address and the read address are, as shown in FIG. 9, formed into a multiplex shape. As a result, the address is picked up in response to an address pickup signal in synchronization with writing and reading to and from the frame memory. Therefore, reading to the two output ports from an arbitrary frame memory other than a frame memory to which writing is being performed can be carried out.

Figure 10:
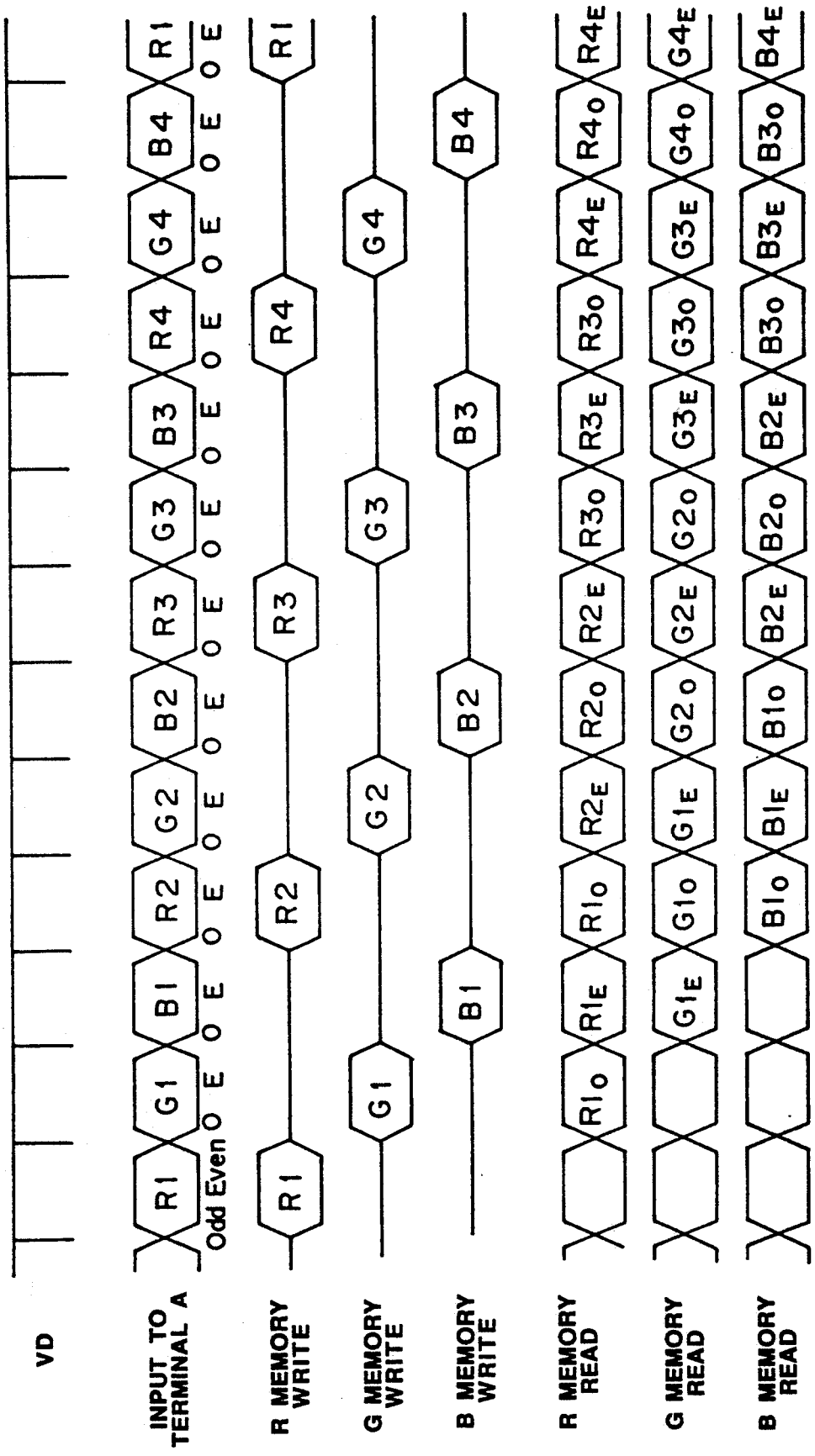

In an ordinary movie mode, monocolor frame (image) data for each of R, G and B is, at one vertical synchronizing signal (hereinafter called a "1VD") period, supplied to the terminal A as shown in FIG. 10. The image data is time-divided into an odd number field (Odd) and an even number field (Even). The writing chip select controller 45A selects image data Rn, Gn and Bn every 1VD in an ascending sequential order of the suffix. By cyclically repeating the above-described operation, monocolor plane sequence image data for R, G and B are allocated to R, G and B memory banks so as to be written to the frame memory.

Reading from the frame memory is controlled by the reading chip select controller 45B in synchronization with vertical synchronizing signal VD supplied immediately after writing has been performed in such a manner that field data is read out. At this time, a field which coincides with field information of the video synchronizing signal is read out. For example, referring to FIG. 10, data R2 is written, and then Even data of R2 is read in the next field before Odd data of R2 is read in the next field. Then, Even data of R2 is read in the next field. Also data for G and that for B are similarly operated by being delayed by one field, respectively.

Image data supplied to the above-described correlation detection circuit 48 in the above-described movie mode is, by the correlation detection circuit 48, subjected to a process in which the degree of correlation between R, G and B image data items is detected so as to be formed into numerals. The numeral data is supplied to a memory 49A in which it is held for a period in which writing to the FMS 44 is performed, that is, for 12 fields. Therefore, as shown in Table 1, there are 12 ways of combinations of the frame memories to be read out.

TABLE 1

| | Field | | | | | | | | | | | |
|---|---|---|---|---|---|---|---|---|---|---|---|---|
| R Read | R1 | R2 | R2 | R2 | R3 | R3 | R3 | R4 | R4 | R4 | R1 | R1 |
| R1G Read | G1 | G1 | G2 | G2 | G2 | G3 | G3 | G3 | G4 | G4 | G4 | G1 |
| G1B Read R1 | B1 | B1 | B1 | B2 | B2 | B2 | B3 | B3 | B3 | B4 | B4 | B4 |

Data denoting the degree of the correlation of the above-described 12 ways (however, forward or behind image data of the combinations of R, G and B by one in terms of time is taken into consideration) is written to memory 49A so as to be held there. After one cycle of writing to the FMS 44 has been completed, data denoting the degree of the former correlation (R, G, B) is rewritten by data denoting the degree of the latter correlation (R, G, B). In a case where data is being written to the frame memory G2, the three ways of the combination (R2, G2, B1), (R2, G2, B2) and (R3, G2, B2) shown in Table 1 cannot be read. Therefore, data of 9 ways of the combinations of R, G and B obtaining by excluding the above-described three ways and data denoting the degree of the correlation are significant.

The sequential order discrimination (that is, the sequential order discrimination in an ascending direction of the amount of movement of the R, G and B images) of the correlation quantity with respect to data denoting the degree of correlation of the above-described 9 ways is made by an encoder 49B and a sorter 49C. When the freeze trigger is, as shown in FIG. 7, supplied to a CPU 50, it controls the above-described encoder 49B or the reading chip select controller 45B to which the output from the encoder 49B is supplied. As a result, the combination of (R, G, B) which corresponds to data denoting the strongest correlation among data denoting the degrees of the above-described 9 combinations is immediately selected. Image data of the above-described selected combination of (R, G, B) is transmitted via the D/A converter which is connected to the output port so as to be, for example, displayed on a monitor.

As described above, the image which displays the strongest RGB correlation among images obtained before the receipt of the freeze trigger, that is, the image which displays the minimum color misregistration is selected and transmitted. Assuming that the combination (R4, G3, B3) is selected, writing of R4, G3 and B3 to the frame memory is inhibited in the R, G and B memory banks and as well as writing to the other frame memories is enabled. Therefore, writing of R1, R2 and R3 is cyclically performed in the memory bank for R, writing of G1, G2 and G4 is performed in the memory bank for G and writing of B1, B2 and B4 is performed in the memory bank for B.

If the degree of the correlation with respect to a new combination of R, G and B is stronger than the degree of the correlation of the combination (R4, G3, B3) at this time, the above-described new combination of R, G and B is transmitted to the output port which is connected to the D/A converter. As a result, writing to the corresponding frame memories is inhibited and writing to the other frame memories is enabled. In this case, writing of R4, G3 and B3 to the frame memory is allowed. By performing the above-described operation for the predetermined period Tb shown in FIG. 8, the color misregistration prevention freeze after the receipt of the freeze trigger can be performed. Therefore, a freeze image which displays the minimum color misregistration in the periods Ta and Tb (the total period is Ta+Tb) before and after the moment at which the freeze trigger is supplied can be displayed or recorded.

According to this embodiment, an effect can be obtained in that the time lag from the input of the freeze trigger to the display of the freeze image which displays the reduced color misregistration can be reduced. Furthermore, another effect can be obtained in that a freeze image which displays reduced color misregistration can be displayed while eliminating a necessity of enlarging the capacity of the frame memory.

A monochromatic observation is sometimes performed with the apparatus having the color misregistration prevention freeze function capable of displaying a still picture displaying a reduced color misregistration. In case of the above-described monochromatic image, the color misregistration is not generated necessarily. If the color misregistration prevention operation is performed similarly to the case of the color image, a certain time delay will be generated in response to the freeze operation. In this case, a structure shown in FIG. 11 may be employed in which the freeze image is immediately displayed in the case of the monochromatic image while eliminating the delay.

FIG. 11 illustrates an image freezing signal-processing apparatus 60 according to a fifth embodiment of the present invention, in which the RGB plane sequence image signals photographed by, for example, the electronic scope 12 shown in FIG. 2 and, if necessary, processed in the process circuit are supplied to a color misregistration prevention freeze means 61 composed of an AD converting means 62, a (image) memory means 63, a DA converting means 64 and a color misregistration prevention freeze control means 65. The color misregistration prevention freeze means 61 sequentially stores the RGB plane sequence input signals in its memory means 63 in the movie display mode. The color misregistration prevention freeze means 61 then reads it as RGB time-coincidence image signals from the memory means 63 to adapt to a standard TV signal so as to transmit it. In a still picture display mode, updating of data in the memory means 63 is inhibited by the color misregistration prevention freeze means 61. As a result, a still picture signal is transmitted.

The color misregistration prevention control means 65 has a color misregistration prevention freeze mode in which a control is performed in such a manner that the amount movement of the subject in a predetermined time after the freeze instruction has been made is detected and an image which displays the minimum amount of movement of the subject is stored in the memory means 63. The color misregistration prevention control means 65 has an immediately freezing mode in which freezing is immediately performed in response to the freeze instruction. The color misregistration prevention control means 65 is controlled in response to a signal supplied from a freeze operation control means 67.

The above-described freeze operation control means 67 receives an output from a monochromatic display instruction means 69 and an instruction signal transmitted from a freeze instruction means 68. The freeze operation control means 67 controls the color misregistration prevention freeze control means 65 in such a manner that it selects the immediately freezing mode when the freeze instruction is made during the monochromatic display operation and the color misregistration prevention freeze mode in a case where an ordinary display is being performed. A monochromatic display means 66 usually directly transmits the RGB signals supplied from the color misregistration prevention freeze means 61 to a monitor means (omitted from illustration). When the instruction signal is supplied to the same from a monochromatic display instruction means 69, the monochromatic display means 66 transmits a specific color component signal, for example, a G signal of the above-described RGB signals to the R, G and B output terminals.

FIG. 12 illustrates a specific structure of the color misregistration prevention freeze means 61.

An output signal from the A/D converting means 62 is supplied to a first memory means 70 which constitutes the image memory means 63. The signal thus-received is then subjected to a time-coincidence process in the first memory means 70 before it is supplied to a second memory means 71 serving as a still picture memory means. The output from the first memory means 71 is supplied to the D/A converting means 64.

The output from the above-described first memory means 70 is supplied to a movement detection means 72 in which the amount of movement is detected, the detected amount of movement being then supplied to a minimum value holding means 73 and a freeze control means 74.

The above-described minimum value holding means 73 holds the minimum amount of movement and transmits the held amount of movement to the freeze control means 74. The freeze control means 74 is also connected to a timer means 75 so as to performs a control operation in response to a signal supplied from the freeze operation control means 67 whether or not the second memory means 71 is brought to a write inhibited state.

For example, when the freeze instruction means 68 is operated, a signal for generating the color misregistration freeze image is supplied to the freeze control means 74 via the freeze operation control means 67. Then, a control is performed in such a manner that an image which displays a small amount of movement within a time set by the timer means 75 is written from the first memory means 70 to the second memory means 71 and as well as an image which displays the minimum amount of movement is held in the second memory means 71.

If the monochromatic display instruction means 69 is operated, the freeze control means 74 immediately brings the second memory means 71 into the write inhibited state. As a result, an image stored in the second memory means 71 before the above-described write inhibited state is repeatedly read out as the freeze image.

Figure 13:
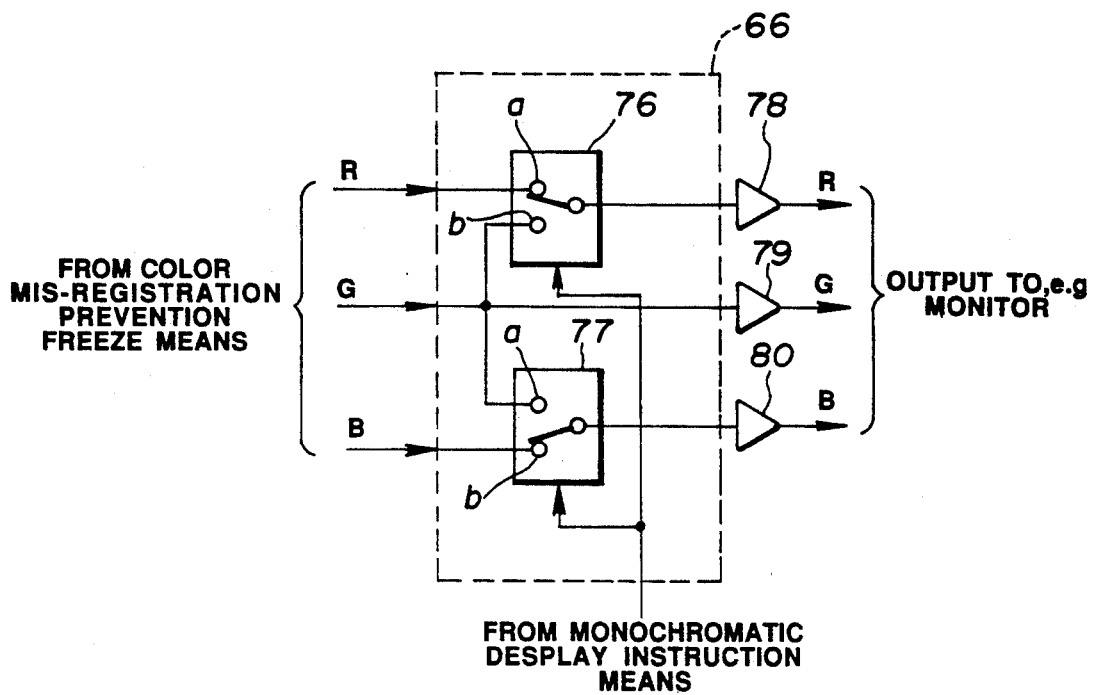

FIG. 13 illustrates the schematic structure of the monochromatic display means 66.

The R, G and B signals transmitted from the color misregistration prevention freeze means 61 are supplied to signal switch means 76 and 77 constituted by two analog switches the switching operations of which are controlled by the monochromatic display instruction means 69. The R and B signals are applied to a contact a of each of the signal switch means 76 and 77, while the G and B signals are supplied to a contact b of each of the signal switch means 76 and 77. Common contacts are connected to input terminals of buffer means 78 and 80, while the G signal is connected to an input terminal of a buffer means 79 after it has passed through the monochromatic display means 66.

When a monochromatic freeze instruction is made from the monochromatic display instruction means 69, switching is performed in such a manner that the contact b is turned on. As a result, the image stored in the second memory means 71 is displayed in a monochromatic manner.

As described above, the fifth embodiment is arranged in such a manner that the color misregistration prevention freeze mode and the immediately freezing mode are provided so as to be switched over in synchronization with the monochromatic display instruction. As a result, an excellent quality still picture displaying reduced color misregistration can be obtained in an ordinary color image freeze mode and as well as a freeze operation without a delay can be performed so that the freeze operationality can be improved.

Figure 14:
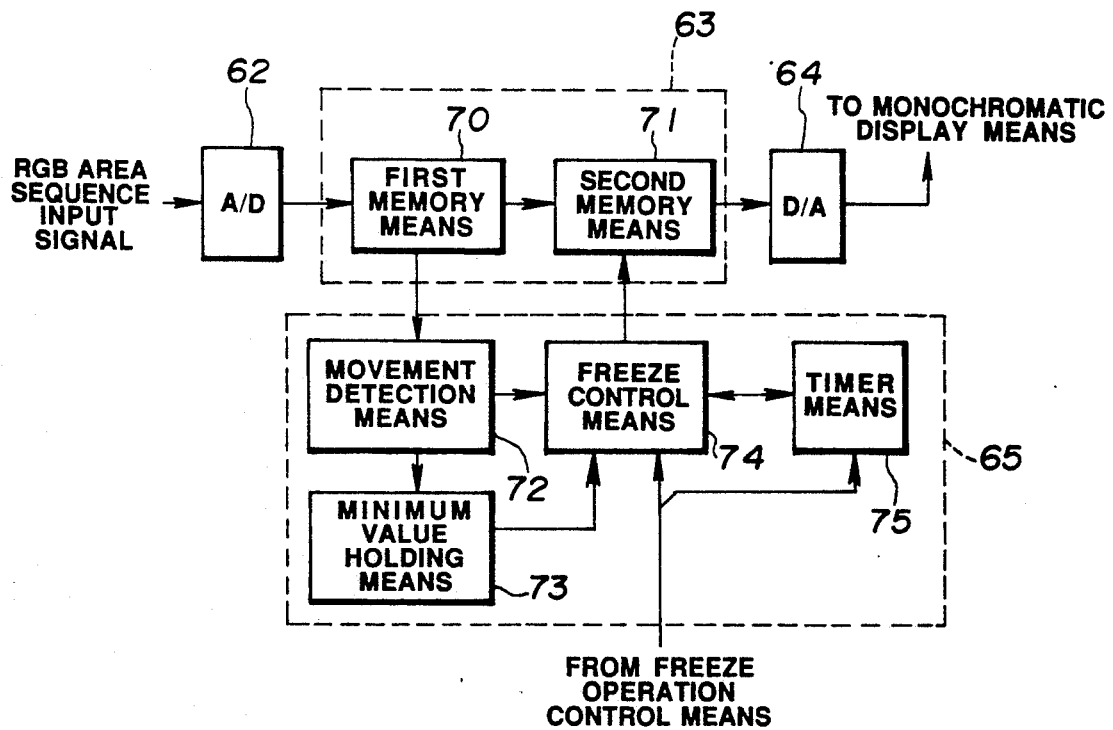

Then, modification to the fifth embodiment will now be described. FIG. 14 illustrates modification to the structure shown in FIG. 12. Referring to FIG. 14, the structure is arranged in such a manner that the output signal from the freeze operation control means 67 is also supplied to the timer means 75 and, in response to this output signal, the freeze control means 74 and the timer means 75 are controlled. Furthermore, the color misregistration prevention freeze mode and the immediately freezing mode are properly switched over. In addition, the time in which the movement of the subject is detected can be varied by the timer means 75 in the color misregistration prevention freeze mode. The remaining structures are the same as those of the structure shown in FIG. 12.

Figure 15:
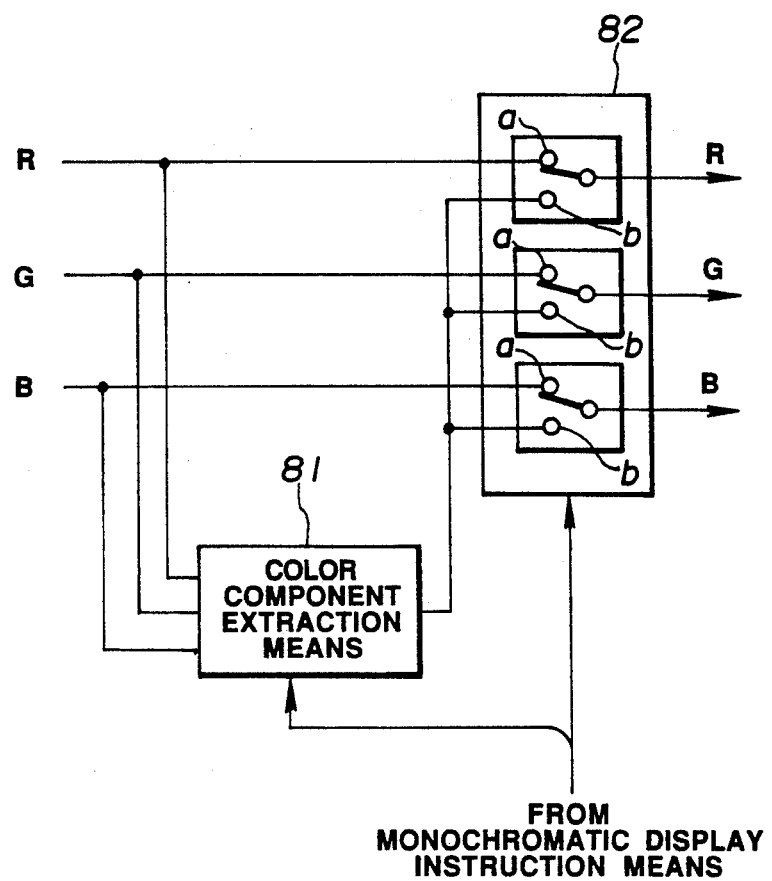

FIG. 15 illustrates modification to the structure shown in FIG. 13.

Referring to FIG. 15, the R, G and B signals are supplied to a color component extraction means 81 and as well as the same as are supplied to contacts a of switches constituting a switch means 82. Furthermore, a common extraction color signal extracted by the color component extraction means 81 is supplied to each of contacts b. The switch means 82 is arranged in such a manner that its contacts b are turned on by the monochromatic display instruction means 69.

With the structure shown in FIG. 15, the outer shape of a monochromatic freeze image is displayed in response to an output signal from the color component extraction means 81.

In an electronic endoscope apparatus having an automatic aperture mechanism, the color of the image can be undesirably changed if the freeze operation is performed during the automatic aperture operation because the quantity of light applied to the subject is changed in each R, G and B light. Furthermore, in a time-coincidence type electronic endoscope apparatus, the difference in the brightness between two filed images appears as flickers in particular in a case where photographing is performed in a frame mode in which one image is obtained from two field images.

A second problem takes place in that, when the objective lens is cleaned with water supplied from the leading portion of the endoscope body, the automatic aperture reacts to light reflected from water and thereby the brightness changes excessively.

A third problem takes place in that, when light except for illuminating light is made incident upon the photographing device in a case where, for example, laser beams are applied for the purpose of performing an operation in the coelom, the automatic aperture erroneously operates and thereby proper brightness cannot be obtained.

Figure 16:
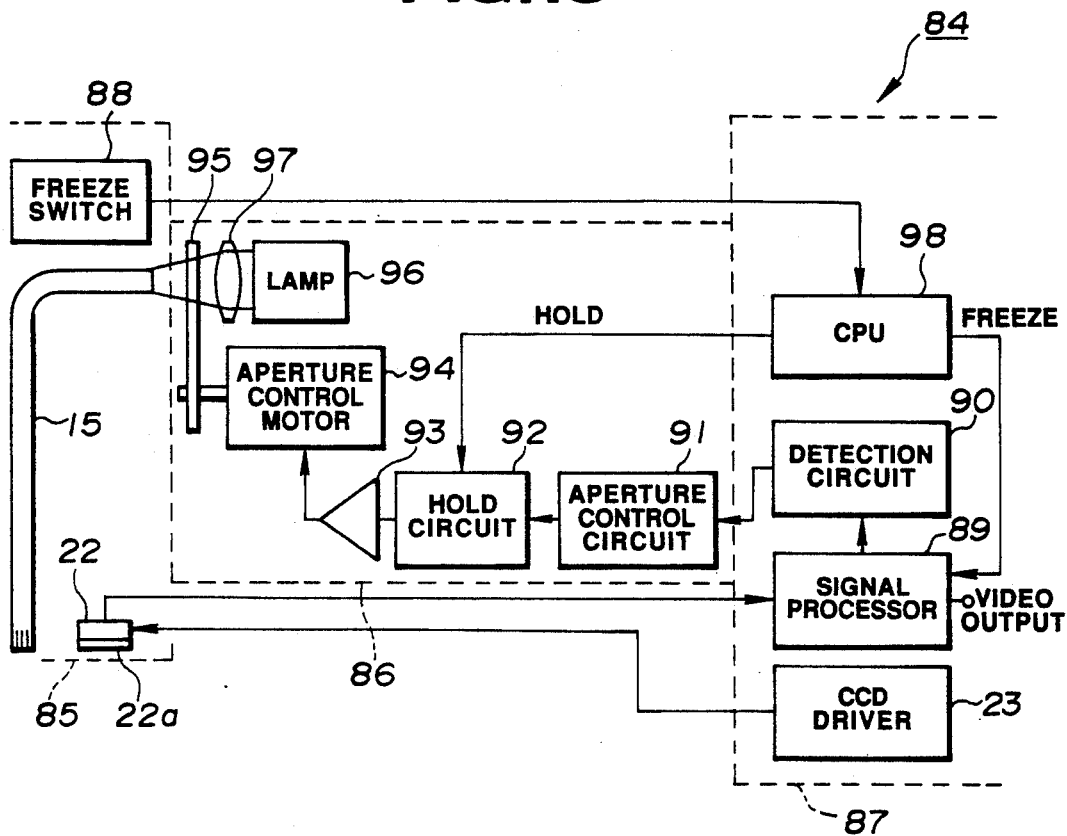

The above-described problems can be overcome by using an endoscope apparatus 84 which is shown in FIG. 16 and to which a sixth embodiment is applied.

The endoscope apparatus 84 shown in FIG. 16 comprises an electronic scope 85, a light source portion 86, the image processor portion 87 according to the fifth embodiment and a monitor (omitted from illustration). The above-described endoscope 85 is constituted by, for example, a freeze switch 88 is additionally provided to the structure shown in FIG. 6.

An image signal read from the CCD 22 in response to the drive signal transmitted from the CCD driver 23 of the image processor portion 87 is supplied to the signal processing circuit 89 in which the image signal is processed so that a standard video signal is generated, the standard video signal being then transmitted from a video output terminal toward the monitor. An output, for example, a brightness signal, from the signal processing circuit 89 is supplied to a detection circuit 90 in which a detection operation is performed so that the average level is detected before the result of this is supplied to an aperture control circuit 91 disposed in the light source portion 86. The aperture control circuit 91 compares the supplied signal level with a standard level under a proper illumination state so as to transmit a signal denoting the difference obtained from the above-described comparison process to a motor drive circuit 93 via a hold circuit 92.

The above-described (motor) drive circuit 93 amplifies an electric current so that the rotational angle of an aperture control motor 94 is controlled. An aperture plate 95 is attached to the rotational shaft of the aperture motor 94, the aperture plate 95 being arranged to control its quantity of insertion/retracting from the illumination passage when the motor 94 is rotated. As a result, the aperture plate 95 is capable of controlling the quantity of light emitted from a lamp 96 via a condenser lens 97 to illuminate the light incidental end surface of the light guide 15.

A freeze instruction signal transmitted when a freeze switch 88 is switched on is supplied to a CPU 98. The CPU 98 transmits a hold signal to a hold circuit 92, the hold signal being a signal for stopping the aperture operation in at least one frame period. When the hold circuit 92 receives the hold signal transmitted from the CPU 98, the hold circuit 92 holds an aperture signal obtained in the aperture control circuit 91 for a predetermined period or a period in which the hold signal being supplied so that the aperture operation is stopped.

As described above, the automatic aperture operation is stopped in at least one frame after the freeze instruction has been made. Therefore, the color tone change caused due to the aperture operation performed in the freeze mode (in a case of the plane sequence method) or generation of flickers (in the time-coincidence method) can be prevented. As a result, the image quality in the freeze mode can be improved.

The signal processing circuit 89 has a means (omitted from illustration) for generating the freeze image the structure of which is similar to that shown in FIG. 6.

Figure 17:
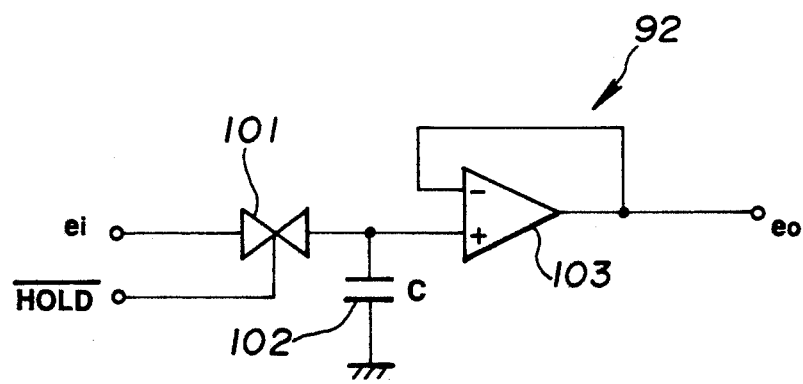
FIGS. 16 to 18 illustrate a sixth embodiment of the present invention, where

FIG. 17 illustrates the schematic structure of the hold circuit 92 shown in FIG. 16.

An output signal (designated by symbol ei shown in FIG. 17) from an aperture control circuit 91 is, via an analog switch 101, supplied to a capacitor 102 so as to be held there. Then, the signal is converted into a signal (designated by symbol e0 shown in FIG. 17) via a buffer 103 so as to be transmitted to the drive circuit 93.

Figure 18:
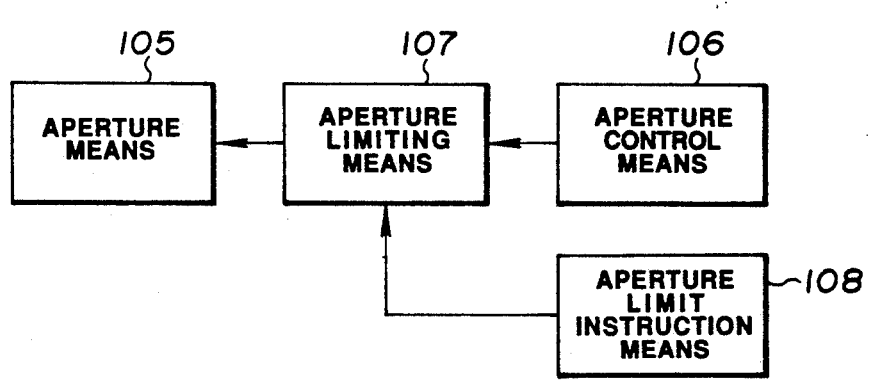

The schematic structure of an essential portion of a sixth embodiment is shown in FIG. 18. That is, the structure according to the six embodiment comprises: an aperture means 105 for changing the quantity of illuminating light; an aperture control means 106 for calculating the optimum aperture quantity from the image signal to control the aperture quantity; an aperture control means 107 for, for a certain period, holding an aperture signal transmitted from the aperture control means 106 to fix the aperture; and an aperture control instruction means 108 for instructing the aperture control means 107 to fix the aperture. As a result, the aperture is fixed in a case where the image quality deterioration takes place when the automatic aperture operation is performed.

Figure 19:
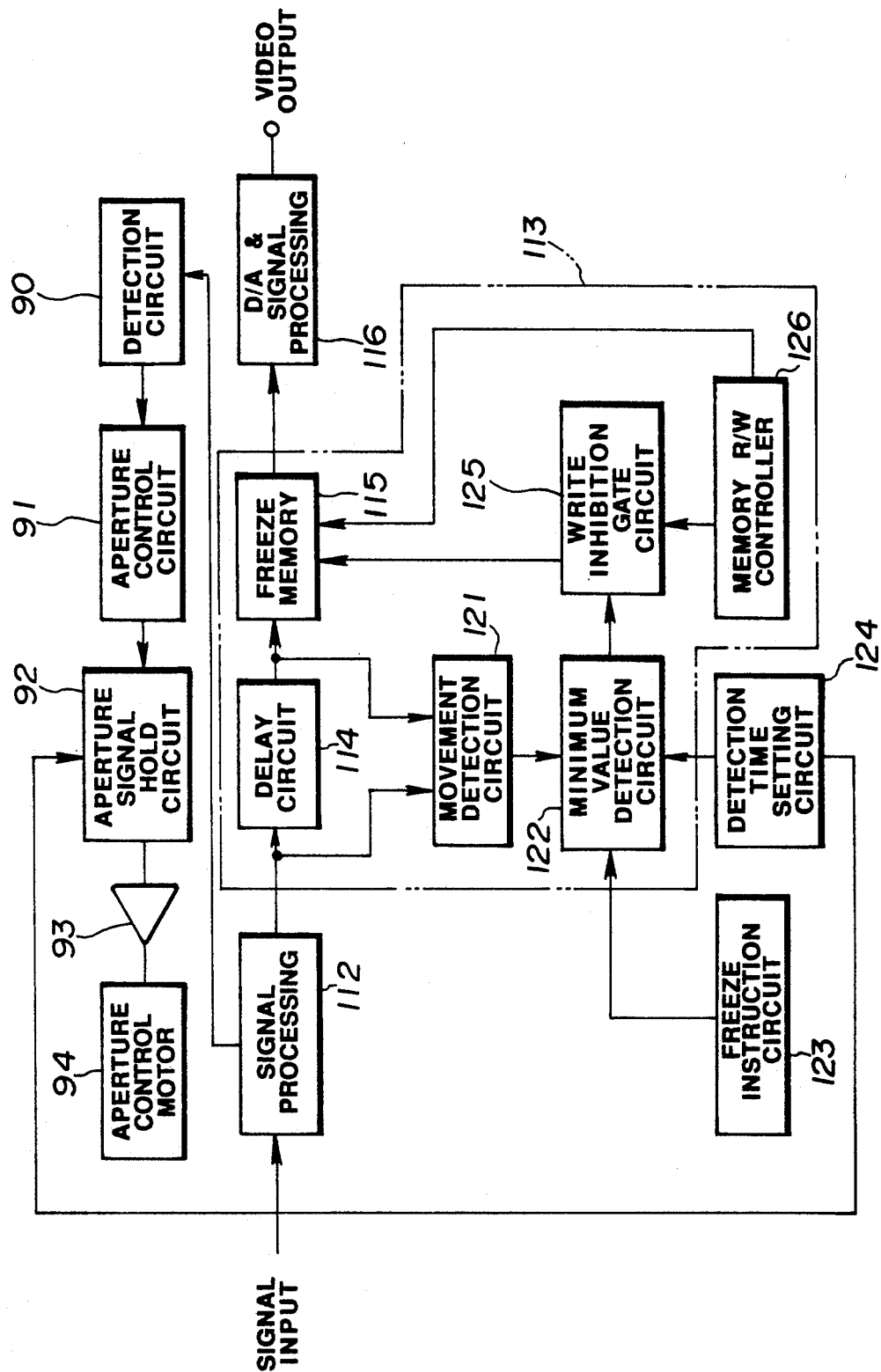
FIG. 19 is a block diagram which illustrates an essential portion of an electronic endoscope apparatus according to a seventh embodiment of the present invention.

As shown in FIG. 19, an electronic endoscope apparatus 111 according to a seventh embodiment of the present invention is arranged in such a manner that a plane sequence image signal transmitted from the CCD 22 disposed in the electronic scope 12 shown in FIG. 2 is supplied to a front signal processing circuit 112 so as to be subjected to processes such as the A/D conversion. Then, the signal thus-converted is supplied to a D/A & rear signal processing circuit 116 via a delay circuit 114 and a freeze memory 115 disposed in a color misregistration prevention freeze circuit 113 so that a standard video signal is transmitted from the video output terminal.

An output, for example, the brightness signal transmitted from the signal processing circuit 112 is, similarly to the structure shown in FIG. 16, supplied to the detection circuit 90. An output signal from the detection circuit 90 is transmitted to the aperture control motor 94 via the aperture control circuit 91, (the aperture signal) hold circuit 92 and the drive circuit 93. The delay circuit 114 delays, for example, the signal by a degree corresponding to one image. An image signal which constitute two images which appear at the I/0 terminal of the delay circuit 114 is supplied to the movement detection circuit 121 so that the amount of movement is detected. The result of the amount of movement detection is supplied to the minimum value detection circuit 122 so that the minimum amount of movement is detected.

The above-described minimum value detection circuit 122 commences its operation by the action of a freeze instruction circuit 123 (it may be arranged to act as that according to the first embodiment) to detect the minimum amount of movement in the detection time set by a detection time setting circuit 124. The minimum value detection circuit 122 then holds the write inhibition gate circuit 125 in a write inhibition state. In the above-described detection time, the minimum value detection circuit 122 transmits a signal for cancelling the write inhibition to the write inhibition gate circuit 125 if it detects the amount of movement which is smaller than the amount which has been held. Furthermore, a memory write signal is supplied from a memory R/W controller 126 to the freeze memory 115 so as to write an image which displays a smaller amount of movement to the freeze memory 115.

After the above-described detection time has passed, the image which displays the minimum amount of movement in this detection amount is held in the freeze memory 115. The above-described image is repeatedly read out so that a freeze image is displayed.

The above-described detection time setting circuit 124 transmits a control signal to the color misregistration prevention freeze circuit 113 so as to cause it to operate for a predetermined time. Furthermore, it transmits a hold signal to the hold circuit 92 so as to stop the automatic aperture operation. The operation of the above-described hold circuit 92 is arranged similarly to the structure shown in FIG. 16.

As a result of the structure shown in FIG. 19, an erroneous operation of the movement detection circuit due to the operation of the automatic aperture circuit can be prevented and thereby a further accurate color misregistration prevention freeze function can be realized.

An electronic endoscope apparatus of a type according to an eighth embodiment of the present invention usually comprises an air supply/water supply mechanism for cleaning the objective lens since it is contaminated with mucus because the leading portion of the electronic endoscope is inserted into the coelom. When the electronic endoscope apparatus is used, the observation image is rapidly changed by light reflected from water droplet flying at the time of the water supply operation. Since the conventional electronic endoscope apparatus is arranged in such a manner that the automatic aperture function acts at the time of the water supply operation, a problem arises in that the image brightness instantaneously becomes abnormal at the time of the completion of the water supply operation.

Figure 20:
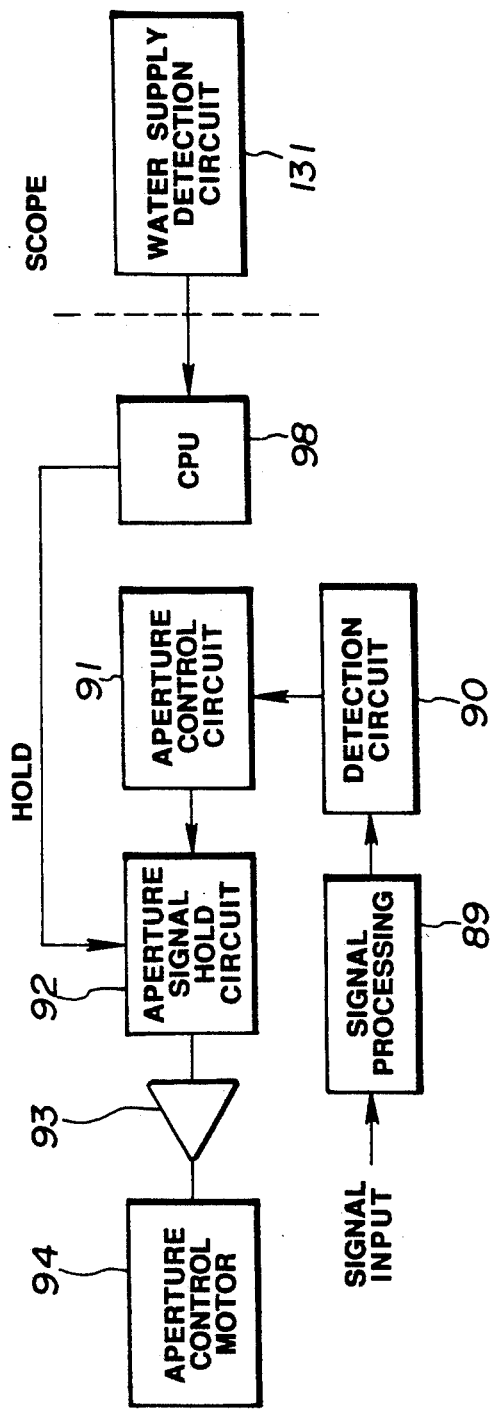
FIG. 20 is a block diagram which illustrates an essential portion of an electronic endoscope apparatus according to an eighth embodiment of the present invention.

FIG. 20 illustrates an essential portion of the electronic endoscope apparatus according to the eighth embodiment of the present invention. According to this embodiment, when a water supply button (omitted from illustration) provided for the electronic endoscope is depressed, an electric switch switches on/off in synchronization with the above-described action of the water supply button so that a water supply detection circuit 131 detects the supply of water. At this time, the CPU 98 generates the hold signal to the (aperture signal) hold circuit so as to fix the automatic aperture. As a result, the brightness abnormality which can be taken place at the time of the water supply operation due to the automatic aperture operation can be prevented.

The remaining structures are the same as those of the structure shown in FIG. 16. Although the water supply action is detected by means of the switch according to this embodiment, another structure may be employed which is arranged in such a manner that a movement detection circuit 121 arranged as shown in FIG. 19 or the like is used to detect the water supply action from the amount of movement of the image because the image changes excessively during the water supply operation.

Then, a ninth embodiment of the present invention will now be described.

Each of the major portion of the endoscope apparatuses has a pipe called a "channel" in the scope thereof so as to perform a variety of curing operations. The above-described operation is exemplified by laser radiation operation which is performed in such a manner that laser beams are, by a tool called a "probe", introduced into the inside portion of the body via the channel so as to cause the affected part to be irradiated with the same. As another curing operation, an electric surgical knife arranged to be included in the endoscope is known. With the above-described apparatus, light is necessarily emitted at the time of the curing operation, causing the automatic aperture mechanism reacts to light thus-emitted. As a result, the brightness abnormality takes place. Accordingly, an electronic endoscope apparatus according to the ninth embodiment and shown in FIG. 21 is arranged so as to overcome the above-described problem.

Figure 21:
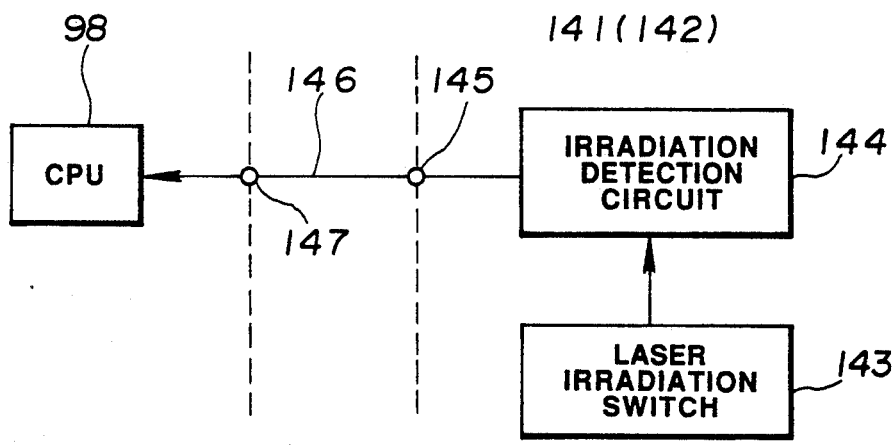
FIG. 21 is a block diagram which illustrates an essential portion of an electronic endoscope apparatus according to a ninth embodiment of the present invention

FIG. 21 illustrates a structure arranged in such a manner that an operational signal is, in place of the water supply detection signal shown in FIG. 20, received from a laser device 141 or an electronic surgical knife device 142 disposed outside the electronic endoscope apparatus so that the automatic aperture operation is stopped during the operation of the above-described units.

That is, a signal transmitted from a laser radiation switch 143 of the laser device 141 is supplied to a radiation detection circuit 144 so that the laser radiation is detected. A detection signal denoting this is supplied to the CPU 98 disposed in, for example, the image processor 87 via a connector 147 after it has passed through a cable 146 connected to a connector 145 of the laser device 141.

The CPU 98 transmits the hold signal to a hold circuit (omitted from illustration) similarly to that of the structure shown in FIG. 20 when the above-described signal is supplied thereto. As a result, the aperture quantity is fixed so as to prevent an erroneous operation which can be taken place during the automatic aperture operation.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

We claim:

1. An image freezing signal-processing apparatus comprising:
   movement detection means for detecting, from a supplied image signal, the movement of a subject;
   minimum value detection means for detecting, from an output from said movement detection means, the minimum value of said amount of movement of said subject;
   still picture storage means for storing a supplied image signal which displays the minimum amount of movement by an output from said minimum value detection means;
   image freeze instruction means for transmitting an image freeze instruction signal;
   timer means for setting a time in which said minimum value detection means is operated; and
   control means for controlling writing, to said still picture storage means, of said image which displays the minimum amount of movement detected, with time, by said minimum value detection means during the operation of said timer means and as well as controlling, if said freeze instruction signal is transmitted during the operation of said timer means, inhibition of writing to said still picture storage means immediately after or after a predetermined time has passed from the moment at which said freeze instruction signal is transmitted during said operation of said timer.

2. An image freezing signal-processing apparatus according to claim 1, wherein said still picture storage means is three-color information still picture storage means which corresponds to each of input color signals for R, G and B.

3. An image freezing signal-processing apparatus according to claim 2, wherein said three-color information still picture storage means includes input color image storage means for storing each of said input color signals for R, G and B and time-coincidence color image storage means for making coincidence each of said input color signals for R, G and B stored in said color input image storage means so as to store them.

4. An image freezing signal-processing apparatus according to claim 3, wherein said control means controls writing, to said time-coincidence color image storage means, of said image which displays the minimum amount of movement detected, with time, by said minimum value detection means during the operation of said timer means and as well as controls, if said freeze instruction signal is transmitted during the operation of said timer means, inhibition of writing to said time-coincidence color image storage means immediately after or after a predetermined time has passed from the moment at which said freeze instruction signal is transmitted during said operation of said timer.

5. An image freezing signal-processing apparatus according to claim 1, wherein said still picture storage means is a two-color information still picture storage means which corresponds to brightness signal Y and color signal C.

6. An image freezing signal-processing apparatus according to claim 5, wherein said two-color information still picture storage means includes input image storage means for storing said brightness signal Y and said color signal C and a time-coincidence image storage means for making coincidence said brightness signal Y and said color signal C stored in said input image storage means so as to store them.

7. An image freezing signal-processing apparatus according to claim 6, wherein said control means controls writing, to said time-coincidence color image storage means, of said image which displays the minimum amount of movement detected, with time, by said minimum value detection means during the operation of said timer means and as well as controls, if said freeze instruction signal is transmitted during the operation of said timer means, inhibition of writing to said time-coincidence color image storage means immediately after or after a predetermined time has passed from the moment at which said freeze instruction signal is transmitted during said operation of said timer.

8. An image freezing signal-processing apparatus according to any one of claim 1, claim 4 or claim 7, wherein said control means includes control timer means for controlling inhibition of writing to said still picture storage means after a predetermined time has passed.

9. An image freezing signal-processing apparatus comprising:
   still picture storage means composed of a plurality of frame memories for storing input image signals for a plurality of frames;
   minimum value detection means for measuring the quantity of a correlation of said input image signals for a plurality of said frames stored in a plurality of said frame memories of said still picture storage means to detect the minimum amount of movement of a subject;
   image freeze instruction means for transmitting an image freeze instruction signal;
   timer means for setting a time in which said minimum value detection means is operated; and
   control means for controlling writing, to said still picture storage means, of said image which displays the minimum amount of movement detected, with time, by said minimum value detection means during the operation of said timer means and as well as controlling, if said freeze instruction signal is transmitted during the operation of said timer means, inhibition of writing to said still picture storage means immediately after or after a predetermined time has passed from the moment at which said freeze instruction signal is transmitted during said operation of said timer.

10. An image freezing signal-processing apparatus according to claim 9, wherein said still picture storage means is three-color information still picture storage means which corresponds to each of input color signals for R, G and B.

11. An endoscope system comprising:
light source means for supplying illuminating light;
an endoscope for photographing an image of a subject with said illuminating light; and
image freezing signal-processing apparatus having
movement detection means for detecting the movement of said subject from a supplied image signal transmitted from said movement detection means;
minimum value detection means for detecting the minimum value of a amount of movement of said subject from an output from said movement detection means;
still picture storage means for storing a supplied image signal which displays the minimum amount of movement from an output from said minimum value detection means;
image freeze instruction means for transmitting an image freeze instruction signal;
timer means for setting a time in which said minimum value detection means is operated; and
control means for controlling writing, to said still picture storage means, of said image which displays the minimum amount of movement detected, with time, by said minimum value detection means during the operation of said timer means and as well as controlling, if said freeze instruction signal is transmitted during the operation of said timer means, inhibition of writing to said still picture storage means immediately after or after a predetermined time has passed from the moment at which said freeze instruction signal is transmitted during said operation of said timer.

12. An endoscope system according to claim 11, wherein said endoscope is an electronic endoscope having a solid-state image sensing device.

13. An endoscope system according to claim 12, wherein said still picture storage means is two-color information still picture storage means which corresponds to brightness signal Y and color signal C.

14. An endoscope system according to claim 13, wherein said two-color information still picture storage means brightness signal Y and said color signal C and a time-coincidence image storage means for making coincidence said brightness signal Y and said color signal C stored in said input image storage means so as to store them.

15. An endoscope system according to claim 14, wherein said control means controls writing, to said time-coincidence color image storage means, of said image which displays the minimum amount of movement detected, with time, by said minimum value detection means during the operation of said timer means and as well as controls, if said freeze instruction signal is transmitted during the operation of said timer means, inhibition of writing to said time-coincidence color image storage means immediately after or after a predetermined time has passed from the moment at which said freeze instruction signal is transmitted during said operation of said timer.

16. An endoscope system according to claim 12, wherein said light source means has radiation means for radiating R, G and B plane sequence illuminating light.

17. An endoscope system according to claim 16, wherein said still picture storage means is three-color still picture storage means which corresponds to each of input color signals for R, G and B obtained from R, G and B plane sequence illuminating light emitted form said light source means.

18. An endoscope system according to claim 17, wherein said three-color information still picture storage means includes input color image storage means for storing each of said input color signals for R, G and B and time-coincidence color image storage means for making coincidence each of said input color signals for R, G and B stored in said color input image storage means so as to store them.

19. An endoscope system according to claim 18, wherein said control means controls writing, to said time-coincidence color image storage means, of said image which displays the minimum amount of movement detected, with time, by said minimum value detection means during the operation of said timer means and as well as controls, if said freeze instruction signal is transmitted during the operation of said timer means, inhibition of writing to said time-coincidence color image storage means immediately after or after a predetermined time has passed from the moment at which said freeze instruction signal is transmitted during said operation of said timer.

20. An endoscope system according to any one of claim 11, claim 14 or claim 15, wherein said control means includes control timer means for controlling inhibition of writing to said still picture storage means after a predetermined time has passed.

21. An endoscope system comprising:
light source means for supplying illuminating light;
an endoscope for photographing an image of a subject with said illuminating light; and
image freezing signal-processing apparatus having
still picture storage means composed of a plurality of frame memories for storing input image signals for a plurality of frames;
minimum value detection means for measuring the quantity of a correlation of said input image signals for a plurality of said frames stored in a plurality of said frame memories of said still picture storage means to detect the minimum amount of movement of said subject;
image freeze instruction means for transmitting an image freeze instruction signal;
timer means for setting a time in which said minimum value detection means is operated; and
control means for controlling writing, to said still picture storage means, of said image which displays the minimum amount of movement detected, with time, by said minimum value detection means during the operation of said timer means and as well as controlling, if said freeze instruction signal is transmitted during the operation of said timer means, inhibition of writing to said still picture storage means immediately after or after a predetermined time has passed from the moment at which said freeze instruction signal is transmitted during said operation of said timer.

22. An image freezing signal-processing apparatus according to claim 21, wherein said still picture storage means is three-color information still picture storage means which corresponds to each of input color signals for R, G and B.

23. An image freezing signal-processing apparatus according to claim 21, wherein said endoscope is an electronic endoscope having a solid-state image sensing device.

24. An image freezing signal-processing apparatus according to claim 23, wherein said light source means has radiation means for radiating R, G and B plane sequence illuminating light.

* * * * *

UNITED STATES PATENT AND TRADEMARK OFFICE
CERTIFICATE OF CORRECTION

PATENT NO.  : 5,164,824
DATED       : November 17, 1992
INVENTOR(S) : Syouichi Ieoka, et al.

It is certified that error appears in the above-indentified patent and that said Letters Patent is hereby corrected as shown below:

On the cover page, Item [75], line 7, the inventor's first name "Akirhiro" should read as --Akihiro--.

Signed and Sealed this

Ninth Day of November, 1993

Attest:

Attesting Officer

BRUCE LEHMAN

*Commissioner of Patents and Trademarks*